(12) United States Patent
Birkhoelzer et al.

(10) Patent No.: US 7,540,032 B2
(45) Date of Patent: May 26, 2009

(54) USER OBJECTS FOR AUTHENTICATING THE USE OF ELECTRONIC DATA

(75) Inventors: Thomas Birkhoelzer, Radolfzell (DE); Frank Krickhahn, Herzogenaurach (DE); Juergen Vaupel, Weisendorf (DE)

(73) Assignee: Siemens Aktiengesellschaft, Munich (DE)

( * ) Notice: Subject to any disclaimer, the term of this patent is extended or adjusted under 35 U.S.C. 154(b) by 727 days.

(21) Appl. No.: 10/798,961

(22) Filed: Mar. 12, 2004

(65) Prior Publication Data

US 2004/0230826 A1 Nov. 18, 2004

(30) Foreign Application Priority Data

Mar. 14, 2003 (DE) .............................. 103 11 327

(51) Int. Cl.
*G06F 21/00* (2006.01)
(52) U.S. Cl. ....................................................... 726/27
(58) Field of Classification Search .................... 707/9; 709/226; 713/155; 726/17, 27
See application file for complete search history.

(56) References Cited

U.S. PATENT DOCUMENTS

| | | | | |
|---|---|---|---|---|
| 6,148,342 | A * | 11/2000 | Ho | 709/225 |
| 6,202,066 | B1 * | 3/2001 | Barkley et al. | 707/9 |
| 6,892,307 | B1 * | 5/2005 | Wood et al. | 726/8 |
| 6,947,989 | B2 * | 9/2005 | Gullotta et al. | 709/226 |
| 7,124,192 | B2 * | 10/2006 | High et al. | 709/229 |
| 7,185,192 | B1 * | 2/2007 | Kahn | 713/155 |

FOREIGN PATENT DOCUMENTS

WO WO 01/11451 A1 2/2001

OTHER PUBLICATIONS

Naomaru Itoi et al., "Senix—Pluggable Authentication Modules for Windows NT", Proceedings of the 2nd USENIX Windows NT Symposium, Seattle, Washington, Aug. 3-4, 1998.
Thomas M. Payerle, Neohapsis Archives, E-mail messages from Jan. 29, 2001 and Jan. 30, 2001, pp. 1-2.
PR 2003, "AMICAS Provides Web-based PACS to University of Alabama At Birmingham Medical West", pp. 1-2.

(Continued)

*Primary Examiner*—Andrew L Nalven
(74) *Attorney, Agent, or Firm*—Harness, Dickey & Pierce, P.L.C.

(57) ABSTRACT

An electronic data processing facility is for the processing of electronic data by changing users. The data processing facility runs an operating system for configuring the data processing facility and an application program for editing the data. It includes a data store for storing the data and a documentation memory for storing documentation data for documenting access to the data. It also includes a user object memory for storing user objects for authentication and documentation. The user object memory contains documentation user objects which can be stored in the documentation memory at the level of the application program for the purpose of documenting access to the data, and an authentication user object which can be assigned a right to access the data at the level of the operating system and which can be assigned a plurality of documentation user objects which are authenticated for this right as a result.

14 Claims, 2 Drawing Sheets

OTHER PUBLICATIONS

Microsoft, "Active Directory Users, Computers, and Groups", pp. 1-23, accessed Jul. 19, 2004.

Jakob E. Bardram, "The Trouble with Login—User Authentication and Medical Cooperation", Centre for Pervasive Computing Department of Computer Science, University of Aarhus 2004.

Jakob E. Bardram et al., "Context-Aware User Authentication—Supporting Proximity-Based Login in Pervasive Computing", Centre for Pervasive Computing Department of Computer Science, University of Aarhus Oct. 2003.

Philips, N. Bazak et al., PACS Workstations 2000: Evaluation, Usability and Performance, Hannover Medical School, Department of Diagnostic Radiology, 2001.

XScreenServer Manuals, Jamie Zawinski, "A screen saver and locker for the X Window System" Jul. 19, 2004.

V. Samar et al., "Unified Login with Pluggable Authentication Modules (PAM)", Open Software Foundation, pp. 1-29. Oct. 1995.

XScreenServer Manual, pp. 1-17, Jul. 20, 2004.

Michael Plitnikas, "Web-Based PACS Solutions—Cedarta I-Reach" Jul. 20, 2004.

Boardroom Minutes: Healthcare, "Web-Based PACS Delivers Improved Care Anywhere", pp. 1-3. Jul. 20, 2004.

Tony Smith, "The Register—Apple Attempts to Patent Fast User Switching", pp. 1-2. Jul. 11, 2003.

Saflink, "Using Multiple Authentication Methods—Protecting Your Enterprise Through Secure Authentication Methods" Jul. 20, 2004.

"Fast User Switching", Fast User Switching (Direct X 9.0 C++ Archive). Aug. 9, 2004.

* cited by examiner

USER OBJECTS FOR AUTHENTICATING THE USE OF ELECTRONIC DATA

The present application hereby claims priority under 35 U.S.C. §119 on German patent application number DE 103 11 327.4 filed Mar. 14, 2003, the entire contents of which are hereby incorporated herein by reference.

FIELD OF THE INVENTION

The invention generally relates to an electronic data processing facility for the editing, storage and reading of electronic data by different users who are granted different data access rights and whose data access operations are documented. The invention also generally relates to a method for operating a data processing facility and to a storage medium with information for carrying out such a method on a data processing facility.

BACKGROUND OF THE INVENTION

Text data and image data, particularly data having a medical relevance, such as findings, diagnostic images or patient data, are increasingly being stored and handled electronically. Electronic handling requires particular measures for making data access operations and data alterations reconstructable. Particularly in the health sector, a large amount of electronic data can be classified as confidential and requires data protection provisions to the effect that any user of electronic data is clearly identified and authenticated. Any data access or any use of the data needs to be clearly documented with an indication of the user ("auditing"), and access to data connected with patients must be granted only to authenticated users ("access control").

Thus, identification represents explicit, individual identification of the user, while authentication refers to the approval of particular data access rights for the user. Authentication thus means authorization of the user for particular data access rights. Authentication fundamentally presupposes identification.

This gives rise to the following demands: for clear documentation, it is necessary for every user to be individually identifiable. To protect the data against unauthorized access, mechanisms on different software levels are conceivable, with the ability to bypass these mechanisms being dependent on the respective depth of the software level. Mechanisms executed on lower software levels, that is to say at operating system level in the extreme case, permit few opportunities for bypass and therefore ensure more secure access protection.

Therefore, access rights when handling security-critical or medically relevant data, particularly personal data and patient data, are implemented at operating system level as far as possible. This requires that a user who is intended to enjoy comprehensive access rights be logged onto a system which is able to grant access to the data as an operating system user. By contrast, a user who is intended to enjoy less comprehensive access rights needs to be logged on merely as an application user in the application software.

One possible system for handling electronic data might be a medical workstation, for example a "modality" which is able to record and edit findings data and image data. Typically, such a workstation is used by a plurality of people at short intervals of time, and these people respectively alternate quickly between looking after the patient and using the appliance. Hence, one and the same workstation is used by a plurality of users in quick succession who look after a plurality of patients. It is obvious that, from the point of view of rationalization and economy of work operations, changing between various users and various patients should take place as quickly as possible.

Other systems for handling confidential electronic data are used, by way of example, in research, in the financial sector, in law or in demographic matters. In principle, personal data and data requiring secrecy need to be regarded as confidential to the same degree.

Since the data in question are generally regarded as being needy of protection to a particular degree, it is demanded that the users be authenticated as securely as possible. On the basis of what has been said above, authentication should thus be implemented at operating system level. The result of this is that it is possible to change between different users only by logging on to the operating system again.

In the systems used today, however, logging onto the operating system again is very time-consuming, since it requires that the operating system be restarted every time and, in addition, that the application program used to edit the data be terminated and restarted every time as well. The time-consuming restart makes implementing the greatest possible access security on workstations which are to be used on a frequently and rapidly changing basis too time-consuming and therefore unacceptable in practical applications which are frequently confronted by time pressure.

Conventional medical workstations and other workstations operating with confidential data therefore have data protection systems which usually either prevent multiple use of the workstation from the outset or provoke deliberate bypassing of the security system in daily use under time pressure by inducing various users to dispense with respectively logging onto the system again by using one and the same common system logon. The use of a common system logon also has the effect that it becomes more difficult to document user data in connection with access operations to the security-critical data, since the system cannot individually identify different users using the same system logon.

SUMMARY OF THE INVENTION

An object of an embodiment of the invention is to specify a system for editing, storing and reading electronic data which allows faster change of users, with no less data protection, and in which full identification for documentation purposes and for correctly authenticating individual users is made possible.

An embodiment of the invention achieves this aim by way of a data processing facility, by way of a method for operating such a facility and by way of a storage medium with information for carrying out such a method on a data processing facility.

An embodiment of the invention is based on the insight that different users of a workstation operating with confidential electronic data frequently belong to the same authentication level, i.e. have the same access rights to the data in question. In the context of data protection in the health sector, the users in a common authentication level can be regarded as one administrative team, for example, whose access rights are defined as team or group access rights.

To date, a user has needed to be logged onto the system as a standard, individual user object which is used for documentation and authentication purposes. An embodiment of the invention decouples the conventional connection between identification object and authentication object. Instead, it uses an individual documentation user object, which contains information for identifying a user, and a separate authentication user object, which defines a particular authentication level. The authentication user object can be allocated on a non-individual basis to all users of an identical authentication level and in this regard can be considered to be a group user object for user groups.

The use of the separate user objects makes it possible to change between users on a common authentication level, e.g. in an administrative team, by changing the individual documentation user object, without inevitably also needing to restart the operating system on account of a related change of authentication user object. By way of example, the change between user objects belonging to a common user group can be made at the level of a piece of medical or personal application software for data editing. Only when changing between users in different user groups is it also necessary to change the authentication level, that is to say to log off and log on again at operating system level.

BRIEF DESCRIPTION OF THE DRAWINGS

The present invention will become more fully understood from the detailed description of preferred embodiments given hereinbelow and the accompanying drawing, which is given by way of illustration only and thus are not limitative of the present invention, and wherein.

DETAILED DESCRIPTION OF THE PREFERRED EMBODIMENTS

Figure 1:
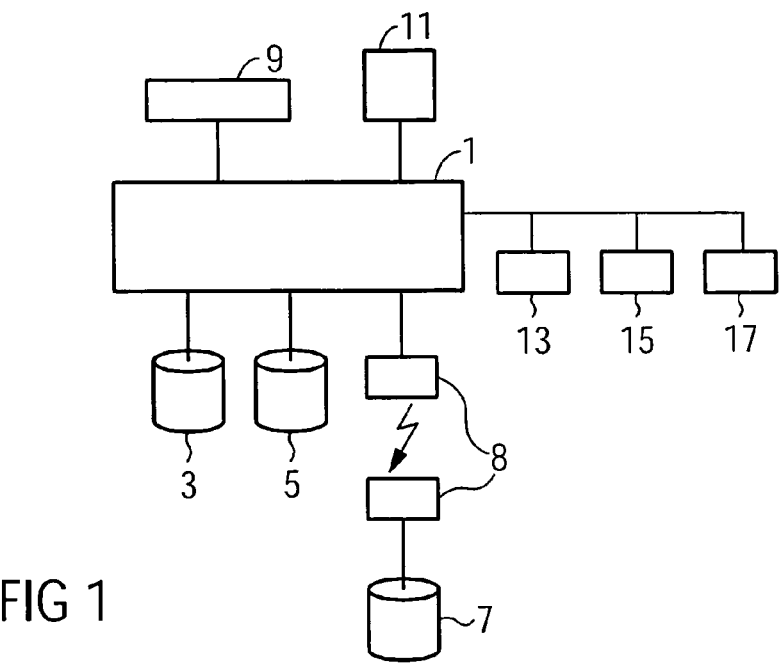
FIG. 1 shows a schematically illustrated data processing facility.

FIG. 1 shows the architecture of a preferred embodiment of the electronic data processing facility. The central element in this data processing facility, which may be a medical workstation, a research workstation or a financial terminal, for example, is a computer 1 which has an input unit 9, e.g. a keyboard, and an output unit 11, e.g. a screen.

The computer 1 has access to a data store 3 for storing personal or medically relevant (that is to say that they need to be classified as confidential) electronic data. The computer 1 runs an operating system (in the normal way) which is required for configuring the hardware and for operating the computer 1. In addition, the computer 1 runs an application program which is suitable for handling the confidential image data, text data, or metadata. The application program can be used, by way of example, for inputting patient data, for inputting medical findings or written reports, for editing diagnostic image data or for recording personal information. Users of the program may be medical specialist personnel or patients, or else administrative personnel, technicians, purchasers, researchers or financial specialists. The computer 1 allows the electronic data to be processed, where processing is intended to mean generation, storage, alteration, deletion or reading and any other data access.

The computer 1 also has access to a documentation memory 5 which documents all access operations to the data in the data store 3. For this purpose, information about the type of access, the accessed data and the accessing user is stored, where access to the data should be regarded not just as alteration but also as simple viewing thereof.

The computer 1 is also connected to an authentication memory 7 which may be arranged at a central location either with a direct connection or remotely from the computer 1 and can be accessed using a data communication link 8. The authentication memory 7 contains information which allows a user of the computer 1 or of the entire data processing system to be identified as a user, to be assigned a user object which he can use to log onto the system, and which makes it possible to establish to which user group the user object belongs. In this case, the user group contains information which defines the authentication level applicable to the user object. In other words, the user object can be assigned and granted access rights using the association with a user group, and hence can be authenticated.

To be able to identify a user of the system and assign him a user object, the computer 1 needs to check information about the user which it can compare with the information in the authentication memory 7. Since the result of this identification is that documentation data are generated and the user's authentication level is stipulated, the actual information to be checked needs to be handled particularly confidentially and protected. The check can therefore be made in the form of a password check.

The use of passwords is known to have the drawback that sufficiently secure passwords are generally long, difficult to remember and complex to input. This complicates use and particularly the rapid changing of users on the system. More practical alternatives to a password check involve using a camera 13 to record biometric data for the user, e.g. the form of his iris, using a key reader 15 to scan a user-specific electronic or mechanical key, or using a chip card reader 17 to check a user-specific chip card. The proposed security systems allow secure identification without any complexity for the user, with, in particular, the check on biometric data being particularly user-friendly and deception proof.

The authentication memory 7 can advantageously be positioned centrally at a remote location from the workstation. This allows it to be used as a data server for an entire building, e.g. a hospital or an office building, or across buildings. When positioned centrally as an authentication server, it can operate in the manner of a trust center using asymmetrical key systems. When using an asymmetrical key system with a public and a private key, there is also no need to operate the data communication link 8 in encrypted form. It goes without saying that adequate protective measures, such as firewalls, need to be provided in order to protect the data in the data store 3 or in the entire system.

The use of a central authentication server increases the portability of the data and also allows the use of expert systems with access to the data by experts working at separate locations, since the documentation and authentication would not be locally restricted. In addition, it would be possible to define and prescribe standards for the various authentication levels centrally in order to be able to use them on a standard basis in the entire data system, for example for the entire health sector.

The operating system running on the computer 1 is used, in a known manner, for configuring the hardware of the computer. It decides what hardware components are available and which users are able to access these components. This allows it to enable, disable or authorize the use of the hardware and hence also of the data stored in the hardware on a user-dependent basis. In addition, the operating system is used as a platform on which application programs can run, in which case it inevitably also authorizes the access rights for the application programs themselves. Since the application programs work on the basis of the operating system, it is possible to terminate and start them while the operating system is running. By contrast, altering the valid authentication level with maximum data protection is possible only by terminating and restarting the operating system.

Figure 2:
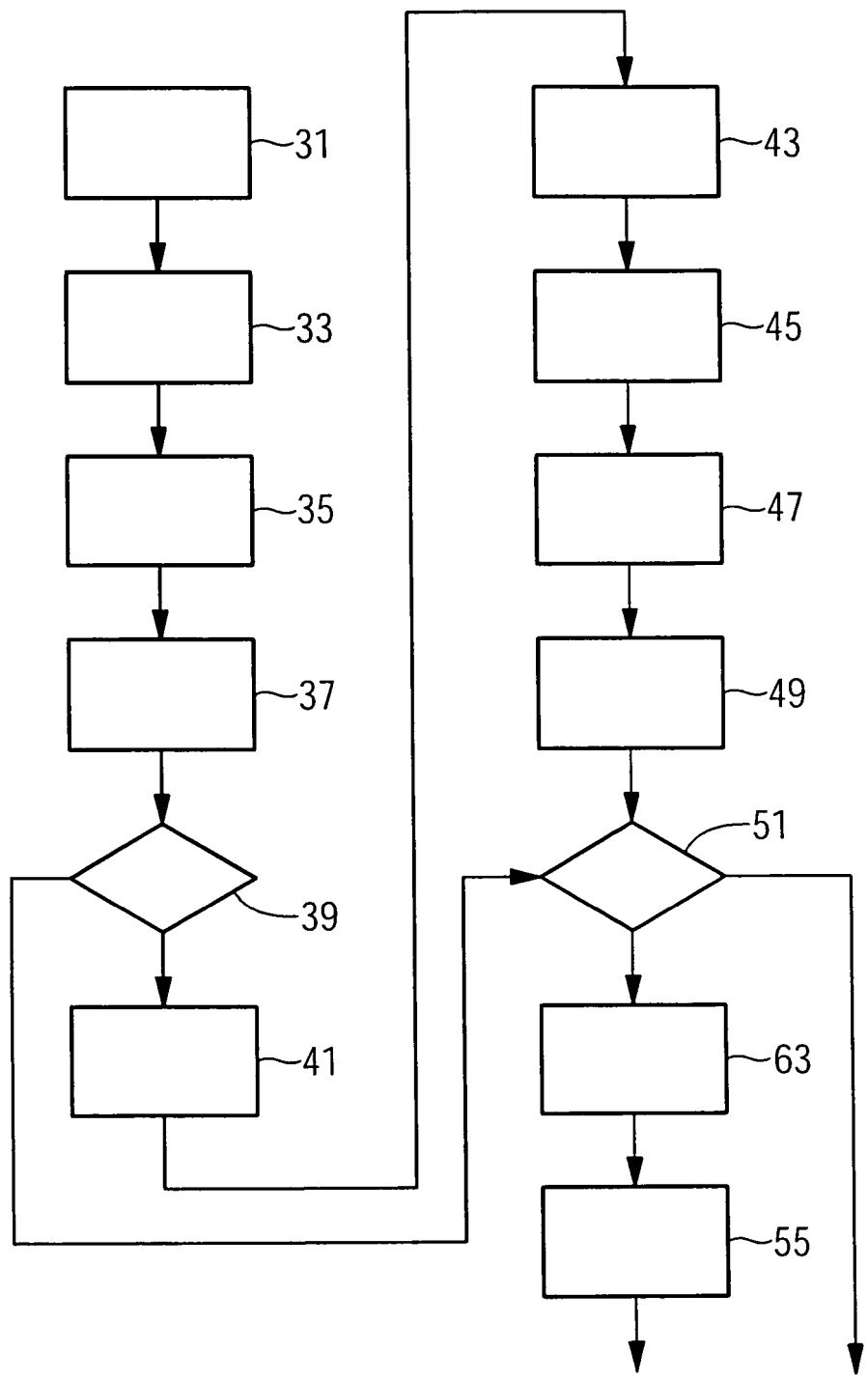
FIG. 2 shows a flowchart.

FIG. 2 shows the method steps according to which an embodiment of the invention operates in the form of a flowchart. The flowchart shows the workflows executed by the operating system and the application programs. In step 31, a user first of all logs on for the purpose of using the system, e.g. the medical workstation. In this case, logon is performed in a known manner by inputting a user identifier using a keyboard or another suitable input unit. The user identifier is the same as a login or a logon name and provides no kind of data protection.

On the basis of a user's logon, a security check is performed in step 33. The security check is used to identify a user in a deception proof manner and is therefore the same as inputting a user password. It can be in the form of password input using a keyboard, or instead biometric data for the user can also be ascertained using a camera, or a mechanical or electronic key or a chip card can be scanned using a checking unit connected to the system.

Depending on the type of security check in step 33, it may be possible to dispense with the input of a user identifier in the preceding step 31. By way of example, an automatically performed biometric test allows full and secure identification to be performed without any action by the user in step 31. The use of a sufficient secure key may be sufficient for recognizing the user and for verification at the same time, that is to say as an actual security check. This simplifies frequent user changes on the system, in particular, because complex keyboard inputs can be dispensed with.

In step 35, the previously recognized user is identified as a user object by a program working at the level of the operating system. The system accesses a data stock which allows users to be recognized on the basis of the data ascertained in the security check. This data stock may either be stored within the system or may be accessible using remotely accessible data, e.g. using the Internet. It is also possible to use local and nonlocal data in parallel.

In the next step 37, it is established to which user group the previously identified user object belongs. To this end, data which may likewise be stored locally or nonlocally are accessed. The data stocks for identifying user objects and for assigning them to user groups may be stored either in the same data store or in separate data stores.

In step 39, a check is carried out to determine whether the user group connected with the user object which currently needs to be logged onto the system corresponds to the one connected with the user object logged on beforehand, or whether the user object belongs to a different user group. If there is a match between the user group which is currently to be logged on and the user group logged on beforehand, the system starts the application program desired by the user in step 49. Otherwise, it is necessary to restart the system, since the change of user group is associated with a change of authentication level, which can be implemented only by changes at operating system level.

To this end, the current configuration of running application programs is buffer-stored in step 41, and the application programs are terminated in step 43. In step 45, the current status of the operating system is buffer-stored, and the operating system is terminated and restarted in step 47.

The buffer-stored data relating to the status of the operating system and the configuration of the applications allow the previous workstation configuration to be restored after the operating system is restarted. In this case, the user identified beforehand at logon can automatically be logged onto the operating system, and the associated authentication level can be set. Alternatively, the user can be asked to log on again in step 31. This requires repetition of the security check in step 33, the identification as a user object in step 35 and the assignment to a user group in step 37. Following successful authentication, the previous configuration of the application programs or a desired application is started in step 49.

In step 51, the application program establishes whether the user object currently logged on matches the one which is to be logged on anew, or whether a change has taken place. If a change has taken place, the now valid user object is entered again in step 53 at the level of the application program and can now be retrieved for documentation purposes at any time, otherwise the previous user object remains active.

In step 55, the user's data access operations to the confidential data are documented. This involves documenting which user uses which application program to access which data at what time. In addition, the type of data access is documented, i.e. a record is made of whether the data have been edited or merely viewed.

The flowchart in FIG. 2 makes it clear that the invention simplifies the changing of users on the system. In conventional systems, steps 41 to 49 for restarting operating systems and application programs need to be executed for every change of user, in which case particularly step 47, in which the operating system is restarted, is particularly time-consuming. By contrast, an embodiment of the invention makes it possible to dispense with these steps whenever it is established that the authentication level or the authentication user object connected with the user who is to be logged on anew matches that of the user who is currently logged on. This always involves dispensing with restarting the operating system and, at most, restarting the application program in order to change the documentation user object.

Generally, however, it will be possible to dispense with restarting the application program in order to change the documentation user object. Instead, the new user object is recorded only within the application.

Figure 3:
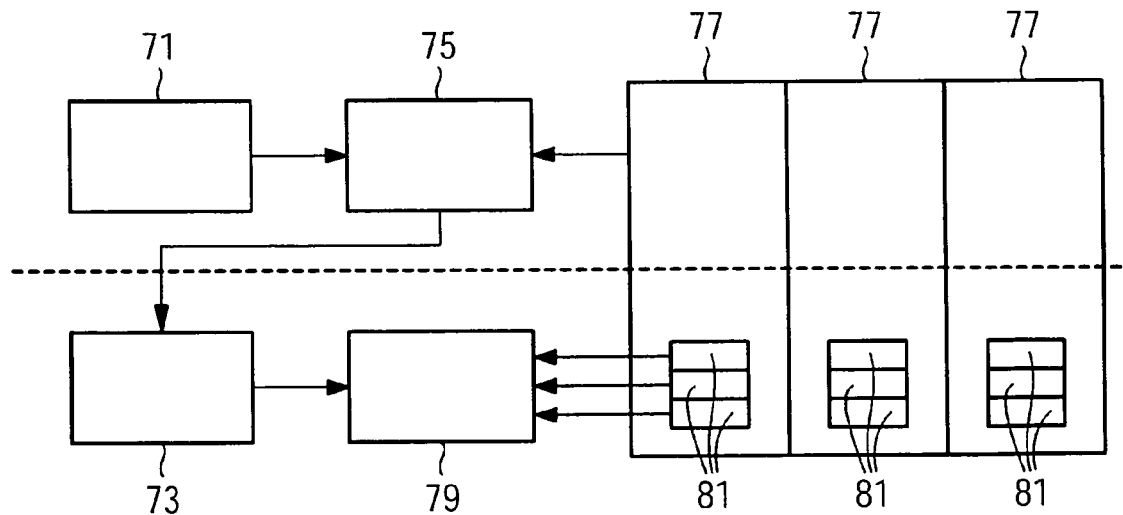
FIG. 3 shows user levels.

FIG. 3 illustrates the isolation between operating system and application level, which an embodiment of the invention uses to advantage. In FIG. 3, the operating system 71 is on the level above the dashed line, which is isolated from the level of the application programs 73 below the dashed line.

The operating system 71 is responsible for configuring the hardware of the data processing facility and for identifying and authenticating a system user. To this end, the operating system has an authentication entity 75 which is either part of the operating system or operates at the level of the operating system in order to be able to prescribe a different authentication level according to the user object. The hardware configuration associated with an authentication level and the respective scope of access rights are defined in user groups 77 in this case. Each user group 77 defines a dedicated authorization level and a dedicated hardware configuration. The authentication user object and hence the user group 77 are changed at the level of the operating system 71.

At the level of the application programs 73, the data access operations permitted in line with the allocated authentication level take place and are documented by the documentation entity 79. The documentation entity 79 records which user has accessed which data in what manner at what time. Both data access operations for altering the data and those for merely viewing the data are documented. The scope of documentation corresponds at least to the legal stipulations in force which have been prescribed to the data. To record the user who is accessing data, the documentation entity 79 requires information in order to identify him. This information is provided by the respective documentation user object 81 logged on, whose identifier is stored as the originator of any data access.

The user objects 81 are each part of a user group 77. A change of user object 81 does not have to entail a change of authentication level, i.e. it may be made without changing the user group 77 and merely at the level of the application program 73. To clarify this, FIG. 3 respectively shows a plurality of user objects 81 within a user group 77 at the level of the application program. From the illustration, it can be seen that just changing to a user object 81 in a different user group 77 also necessitates changing the user group and hence a change at the level of the operating system. Only in such cases does it become necessary to restart the operating system 71, and this may entail changing the authentication level, which results in the authentication entity 75 granting the application program 73 a different scope of access rights.

The scope of data access rights is thus prescribed by the operating system level, while data access operations are documented exclusively at application program level.

A program may further be adapted to interact with an electronic data processing facility in order to carry out the method of an embodiment of the present application. The program may be stored on a storage medium on which the program information is stored.

The program can be offered in the form of a computer-readable storage medium. The storage medium may be a built-in medium installed inside a computer main body or removable medium arranged so that it can be separated from the computer main body. Examples of the built-in medium include, but are not limited to, rewriteable involatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable involatile memory, such as memory cards; and media with a built-in ROM, such as ROM cassettes.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electronic data processing facility adapted to run an operating system for configuring the data processing facility and an application program for editing data, comprising:
    a data store for storing the data;
    a documentation memory for storing documentation data for documenting access to the data; and
    a user object memory for storing user objects for authenticating and documenting access to the data, the user object memory being further for storing documentation user objects storable in the documentation memory at the level of the application program for the purpose of documenting access to the data, and for storing an authentication user object which is assignable a data access right at the level of the operating system based on a comparison between the authentication user object and a previous authentication user object, and which is assignable to a plurality of documentation user objects for authenticating the data access right to the documentation user objects, the documentation user objects being separate from the authentication user objects, and the documentation user objects identifying users at the level of the application program; wherein
        the electronic data processing facility is configured to change between users on a common authentication level by changing the documentation user object, the users on the common authentication level having a common authentication user object, the common authentication user object identifying the users at the level of the operating system.

2. The electronic data processing facility as claimed in claim 1, wherein a security check is performed, to identify a user prior to accessing the data, and wherein a documentation user object and an authentication user object are assignable to a user on the basis of a result of the security check.

3. The electronic data processing facility as claimed in claim 2, further comprising at least one of a device for checking biometric data, a device for checking at least one of a mechanical and electronic key and a device for checking a chip card, to perform the security check.

4. The electronic data processing facility as claimed in claim 1, wherein the user object memory is connected to the data processing facility via a connection suitable for data communication.

5. A method for the processing of electronic data by a first user using an electronic data processing facility, adapted to run an operating system for configuring the data processing facility and an application program for editing the data, comprising:
    identifying the first user as a documentation user object, the documentation user object identifying the first user at a level of the application program;
    identifying the user as an authentication user object, the authentication user object being separate from the documentation user object and identifying the user at the level of the operating system;
    comparing the authentication user object with a previous authentication user object;
    assigning the authentication user object a right to access data at the level of the operating system based on the comparing step;
    storing data access operations for documentation purposes, in connection with a documentation user object at the level of the application program; and
    changing between the first user and a second user by changing the documentation user object; wherein
        each of the first user and the second user are identifiable by the same authentication user object and are authenticatable for the same data access right.

6. The method of claim 5, wherein the assigning step assigns the authentication user object a same right as is assigned to the previous authentication user object if the authentication user object matches the previous authentication user object.

7. The method of claim 5, wherein if the authentication user object does not match the previous authentication user object, the method further comprises:
    restarting the operating system.

8. A storage medium on which information is stored, adapted to interact with an electronic data processing facility in order to carry out the method as claimed in claim 5.

9. An electronic data processing facility adapted to run an operating system for configuring the data processing facility and an application program for editing data, comprising:
    means for storing the data;
    means for storing documentation data for documenting access to the data; and
    means for storing user objects for authenticating and documenting access to the data, for storing documentation user objects storable in the documentation memory at the level of the application program for the purpose of documenting access to the data, and for storing an authentication user object which is assignable a data access right at the level of the operating system based on a comparison between the authentication user object and a previous authentication user object, and which is assignable to a plurality of documentation user objects for authenticating the data access right to the documentation user objects, the documentation user objects being separate from the authentication user objects, and the documentation user objects identifying users at the level of the application program; wherein the electronic data processing facility is configured to change between users on a common authentication level by changing the documentation user object, the users on the common authentication level having a common authentication user object, the common authentication user object identifying the users at the level of the operating system.

10. The electronic data processing facility as claimed in claim 9, wherein a security check is performed, to identify a user prior to accessing the data, and wherein a documentation user object and an authentication user object are assignable to a user on the basis of a result of the security check.

11. The electronic data processing facility as claimed in claim 10, further comprising at least one of means for checking biometric data, means for checking at least one of a mechanical and electronic key and means for checking a chip card, to perform the security check.

12. The electronic data processing facility as claimed in claim 9, wherein the means for storing user objects is connected to the data processing facility via a connection suitable for data communication.

13. A method for the processing of electronic data using an electronic data processing facility, adapted to run an operating system for configuring the data processing facility and an application program for editing the data, comprising:

identifying a user as a documentation user object, the documentation user objects identifying the user at a level of the application program;

identifying the user as an authentication user object, the authentication user object being separate from the documentation user object and identifying the user at the level of the operating system;

comparing the authentication user object with a previous authentication user object;

assigning the authentication user object a data access right at the level of the operating system based on the comparing step; and storing data access operations in connection with a documentation user object at the level of the application program;

identifying a plurality of users by the same authentication user object to thereby authenticate the plurality of users for the same data access right; and changing between the plurality of users by changing the documentation user object.

14. A storage medium on which information is stored, adapted to interact with an electronic data processing facility in order to carry out the method as claimed in claim 13.

* * * * *